US012307995B2

(12) United States Patent
Lu

(10) Patent No.: US 12,307,995 B2
(45) Date of Patent: May 20, 2025

(54) DRIVING METHOD OF DISPLAY AND DISPLAY

(71) Applicants: Huizhou China Star Optoelectronics Display Co., Ltd., Guangdong (CN); Shenzhen China Star Optoelectronics Semiconductor Display Technology Co., Ltd., Guangdong (CN)

(72) Inventor: Xiaobing Lu, Guangdong (CN)

(73) Assignees: Huizhou China Star Optoelectronics Display Co., Ltd., Huizhou (CN); Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/769,751

(22) PCT Filed: Jan. 24, 2022

(86) PCT No.: PCT/CN2022/073599
§ 371 (c)(1),
(2) Date: Apr. 17, 2022

(87) PCT Pub. No.: WO2023/103166
PCT Pub. Date: Jun. 15, 2023

(65) Prior Publication Data

US 2024/0161675 A1 May 16, 2024

(30) Foreign Application Priority Data

Dec. 7, 2021 (CN) ......................... 202111485219.1
Jan. 11, 2022 (CN) ......................... 202210027929.8

(51) Int. Cl.
*G09G 3/36* (2006.01)
*G09G 3/20* (2006.01)

(52) U.S. Cl.
CPC ......... *G09G 3/3614* (2013.01); *G09G 3/2007* (2013.01); *G09G 3/3607* (2013.01);
(Continued)

(58) Field of Classification Search
CPC .. G09G 3/3614; G09G 3/2007; G09G 3/3607; G09G 2320/0247;
(Continued)

(56) References Cited

U.S. PATENT DOCUMENTS 8,937,632 B2 * 1/2015 Li ........................ G09G 3/2022 345/77
10,417,995 B2 9/2019 Xu
(Continued)

FOREIGN PATENT DOCUMENTS

CN 101075415 11/2007
CN 101615382 12/2009
(Continued)

OTHER PUBLICATIONS

International Search Report and the Written Opinion Dated Aug. 25, 2022 From the International Searching Authority Re. Application No. PCT/CN2022/072941 and Its Translation Into English. (17 Pages).

(Continued)

*Primary Examiner* — Patrick N Edouard
*Assistant Examiner* — Eboni N Giles

(57) ABSTRACT

The present application relates to a driving method of a display and a display, and the driving method includes: obtaining grayscale data based on display data of a target frame image; configuring a voltage value of a first power supply voltage based on the grayscale data to obtain a voltage value of a second power supply voltage; transmitting the second power supply voltage using a parallel transmission manner and caching a voltage value of the second
(Continued)

power supply voltage; updating the voltage value of the second power supply voltage cached in real time based on a current updating time of the target frame image.

16 Claims, 4 Drawing Sheets

(52) U.S. Cl.
CPC ............... *G09G 2320/0247* (2013.01); *G09G 2320/0276* (2013.01); *G09G 2320/0673* (2013.01); *G09G 2330/021* (2013.01); *G09G 2330/023* (2013.01); *G09G 2330/028* (2013.01)

(58) Field of Classification Search
CPC ... G09G 2320/0276; G09G 2320/0673; G09G 2330/021; G09G 2330/023; G09G 2330/028
See application file for complete search history.

(56) References Cited

U.S. PATENT DOCUMENTS

| | | | | |
|---|---|---|---|---|
| 11,151,941 | B1 | 10/2021 | Shikata et al. | |
| 2014/0160182 | A1* | 6/2014 | Hong | G09G 5/02 345/691 |
| 2016/0042687 | A1* | 2/2016 | Jeong | G09G 3/3233 345/690 |
| 2020/0394981 | A1* | 12/2020 | Lee | G09G 3/3696 |
| 2021/0264843 | A1* | 8/2021 | Pyun | G09G 3/2092 |
| 2021/0319740 | A1 | 10/2021 | Pyun et al. | |
| 2023/0143803 | A1* | 5/2023 | Lee | G09G 3/2011 345/690 |

FOREIGN PATENT DOCUMENTS

| | | |
|---|---|---|
| CN | 101873064 | 10/2010 |
| CN | 102024440 | 4/2011 |
| CN | 102737577 | 10/2012 |
| CN | 102750927 | 10/2012 |
| CN | 102956173 | 3/2013 |
| CN | 103165066 | 6/2013 |
| CN | 103680401 | 3/2014 |
| CN | 103680431 | 3/2014 |
| CN | 103956143 | 7/2014 |
| CN | 104200785 | 12/2014 |
| CN | 104240661 | 12/2014 |
| CN | 105118437 | 12/2015 |
| CN | 105262964 | 1/2016 |
| CN | 105528994 | 4/2016 |
| CN | 105895044 | 8/2016 |
| CN | 106324875 | 1/2017 |
| CN | 106847198 | 6/2017 |
| CN | 106847217 | 6/2017 |
| CN | 107065252 | 8/2017 |
| CN | 107068098 | 8/2017 |
| CN | 107316608 | 11/2017 |
| CN | 108665844 | 10/2018 |
| CN | 108932936 | 12/2018 |
| CN | 108986762 | 12/2018 |
| CN | 109308883 | 2/2019 |
| CN | 109859670 | 6/2019 |
| CN | 109872701 | 6/2019 |
| CN | 110111731 | 8/2019 |
| CN | 111415616 | 7/2020 |
| CN | 111968567 | 11/2020 |
| CN | 112289254 | 1/2021 |
| CN | 213025334 | 4/2021 |
| CN | 112382247 | 12/2021 |
| CN | 114360427 | 4/2022 |
| CN | 114360428 | 4/2022 |
| CN | 114787904 | 7/2022 |
| EP | 3392870 | 10/2018 |
| JP | 06-332409 | 12/1994 |
| JP | 09-081081 | 3/1997 |
| JP | 2011-077932 | 4/2011 |
| KR | 10-2012-0074915 | 7/2012 |
| UA | 2013/0127923 | 5/2013 |

OTHER PUBLICATIONS

International Search Report and the Written Opinion Dated Aug. 25, 2022 From the International Searching Authority Re. Application No. PCT/CN2022/073006 and Its Translation Into English. (17 Pages).

International Search Report and the Written Opinion Dated Aug. 29, 2022 From the International Searching Authority Re. Application No. PCT/CN2021/138669 and Its Translation Into English. (20 Pages).

International Search Report and the Written Opinion Dated Aug. 31, 2022 From the International Searching Authority Re. Application No. PCT/CN2022/073599 and Its Translation Into English. (17 Pages).

Notification of Office Action and Search Report Dated Sep. 26, 2022 From The State Intellectual Property Office of the People's Republic of China Re. Application No. 202210027913.7 and Its Translation Into English. (15 Pages).

Notification of Office Action and Search Report Dated Apr. 27, 2023 From The State Intellectual Property Office of the People's Republic of China Re. Application No. 202210027913.7 and Its Translation Into English. (18 Pages).

Notification of Office Action and Search Report Dated Apr. 28, 2023 From The State Intellectual Property Office of the People's Republic of China Re. Application No. 202210027929.8 and Its Translation Into English. (26 Pages).

Notification of Office Action and Search Report Dated Apr. 28, 2023 From The State Intellectual Property Office of the People's Republic of China Re. Application No. 202210027960.1 and Its Translation Into English. (27 Pages).

Notification of Office Action and Search Report Dated Jun. 28, 2024 From The State Intellectual Property Office of the People's Republic of China Re. Application No. 202180006041.X and Its Translation Into English. (17 Pages).

* cited by examiner

DRIVING METHOD OF DISPLAY AND DISPLAY

RELATED APPLICATIONS

This application is a National Phase of PCT Patent Application No. PCT/CN2022/073599 having International filing date of Jan. 24, 2022, which claims the benefit of priority of Chinese Patent Application Nos. 202210027929.8 filed on Jan. 11, 2022 and 202111485219.1 filed on Dec. 7, 2021. The contents of the above applications are all incorporated by reference as if fully set forth herein in their entirety.

FIELD AND BACKGROUND OF THE INVENTION

The present application relates to the field of display technology, and in particular to a driving method of a display and a display.

Display panels with large size, a high refresh rate, and high resolution generally have a condition of excessive power consumption. Under the current context of controlling environmental pollution and improving environmental performance of energy-consuming products, it is more urgent to reduce power consumption of the display panels with large size, high refresh rate, and high resolution display panel.

However, the related technical solutions not only consume too much power in practical applications, but also has a problem of slow data transmission, which is not conducive to ensuring quality of display images. Therefore, how to ensure the quality of the display images while reducing the power consumption of the display panel is an urgent problem to be solved.

SUMMARY OF THE INVENTION

The present application is mainly directed to an urgent problem of how to ensure quality of display images while reducing power consumption of display panels.

In view of the above, the present application provides a driving method of a display and a display, which can dynamically and adaptively adjust a voltage value of a second power supply voltage, reduce energy consumption of a display panel, improve transmission efficiency of power supply voltage data, and ensure quality of a display image.

According to an aspect of the present application, a driving method of a display is provided, the driving method of the display comprises: obtaining grayscale data of a target frame image based on display data of the target frame image; configuring a voltage value of a first power supply voltage based on the grayscale data to obtain a voltage value of a second power supply voltage; transmitting the second power supply voltage using a parallel transmission manner and caching a voltage value of the second power supply voltage; updating the voltage value of the second power supply voltage cached in real time based on a current updating time of the target frame image.

According to another aspect of the present application, there is provided a display, the display comprising: a grayscale obtaining module electrically connected to a power supply configuration module, and configured to obtain grayscale data of a target frame image based on display data of the target frame image; the power supply configuration module electrically connected to the grayscale obtaining module and a power supply cache module, and configured to configure a voltage value of a first power supply voltage of the display based on the grayscale data to obtain a voltage value of a second power supply voltage; a power supply transmission module electrically connected to the power supply configuration module and a power supply updating module, and configured to transmit the second power supply voltage in a parallel transmission manner, and cache the voltage value of the second power supply voltage; and the power supply updating module electrically connected to the power supply cache module, and configured to update the voltage value of the second power supply voltage cached in real time based on a current updating time of the target frame image.

The grayscale data of the target frame image is obtained according to the display data of the target frame image, the voltage value of the second power supply voltage is obtained by configuring the voltage value of the first power supply voltage of the display based on the grayscale data, the voltage value of the second power supply voltage is transmitted in a parallel transmission manner, the voltage value of the second power supply voltage is cached, and finally the voltage value of the second power supply voltage cached is updated in real time according to the current updating time of the target frame image, such that the voltage value of the second power supply voltage can be dynamically and adaptively adjusted according to various aspects of the present application, the power consumption of the display panel is reduced, the transmission efficiency of the power supply voltage data is improved, and the quality of the display screen is ensured.

BRIEF DESCRIPTION OF THE SEVERAL VIEWS OF THE DRAWINGS

The technical solutions and other beneficial effects of the present application will be apparent from the detailed description of the specific embodiments of the present application with reference to the accompanying drawings below.

DESCRIPTION OF SPECIFIC EMBODIMENTS OF THE INVENTION

Figure 1:
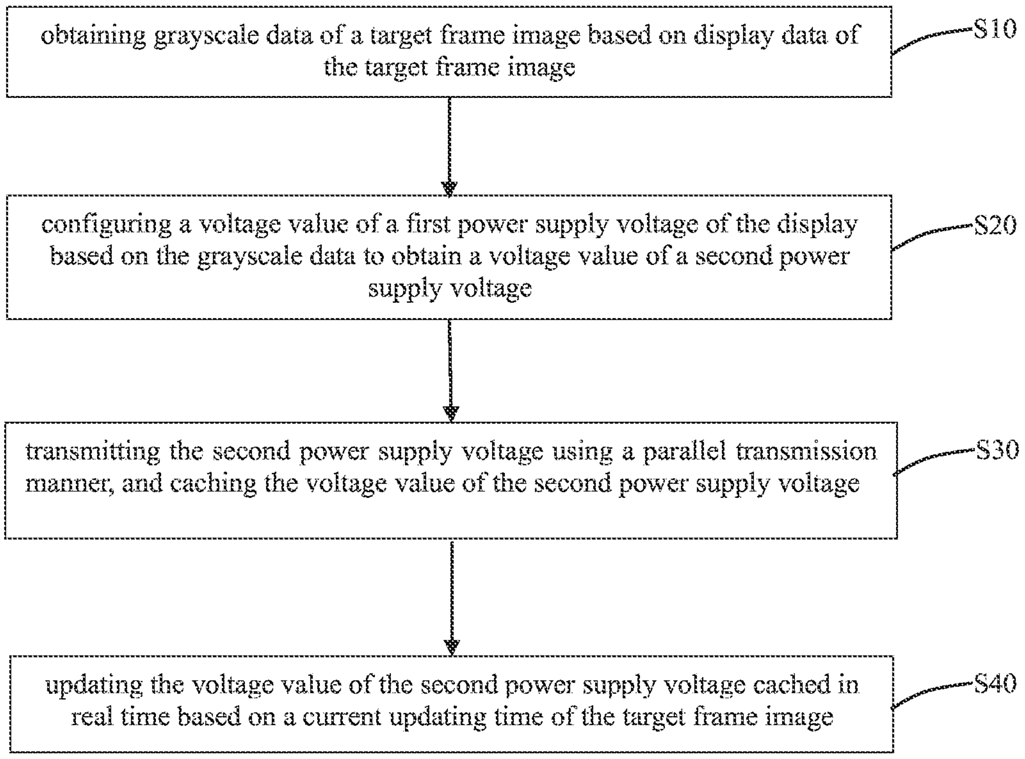
FIG. 1 shows a flowchart of a driving method for a display according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present disclosure, it should be understood that orientations or position relationships indicated by the terms "center", "longitudinal", "lateral", "length", "width", "thickness " , "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include one or more of the features. In the description of the present disclosure, the meaning of "plural" is two or more, unless otherwise specifically defined.

In the description of the present disclosure, it should be noted that the terms "installation", "connection" and "coupling" should be understood in a broad sense, unless otherwise clearly specified and defined. For example, it can be a fixed connection, a detachable connection, or integrated connection; it can be a mechanical connection, an electrical connection or can communicate with each other; it can be directly connected or indirectly connected through an intermediary, it can also be the connection between two elements or the interaction between two elements. Those ordinary skilled in the art can understand the specific meanings of the above terms in the present disclosure according to specific situations.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated by those skilled in the art. In some examples, methods, means, elements, and circuits well known to those skilled in the art are not described in detail in order to highlight the subject matter of the present application.

The present application mainly provides a driving method for a display. The driving method for the display includes: obtaining grayscale data of a target frame image based on display data of the target frame image; configuring a voltage value of a first power supply voltage of the display based on the grayscale data to obtain a voltage value of a second power supply voltage; transmitting the second power supply voltage in a parallel transmission manner, and caching the voltage value of the second power supply voltage; updating the cached voltage value of the second power supply voltage in real time according to a current updating time of the target frame image.

The grayscale data of the target frame image is obtained based on the display data of the target frame image, the voltage value of the second power supply voltage is obtained by configuring the voltage value of the first power supply voltage of the display based on the grayscale data, the second power supply voltage is transmitted in a parallel transmission manner, the voltage value of the second power supply voltage is cached, and finally, the cached voltage value of the second power supply voltage is updated in real time according to the current update time of the target frame image. In the present application, the voltage value of the second power supply voltage can be dynamically and adaptively adjusted, the energy consumption of the display panel is reduced, the transmission efficiency of the power supply voltage data is improved, and the quality of the display image is ensured.

FIG. 1 shows a flowchart of a driving method for a display according to an embodiment of the present application.

As shown in FIG. 1, a display of an embodiment of the present application may include a driving module and a display panel, the driving module is electrically connected to the display panel, and the driving module may be used to drive the display panel. The driving module may store display data of a target frame image(s) in advance. The driving method for the display includes:

Step S10: obtaining the grayscale data of the target frame image based on the display data of the target frame image;

Wherein the driving module stores display data of a target frame image in advance. For example, a memory may be provided in the driving module to store display data of a target frame image in advance. Of course, the display image of the display panel may include a plurality of frames, and display data of all frames of the display panel may be stored in the driving module in advance.

Further, the target frame image of the display panel includes a plurality of pixel points, wherein at least one pixel point is preset with a grayscale corresponding to the pixel point. The display data of the target frame image may be represented by a one-dimensional array or a multi-dimensional array, each element in an array may correspond to each pixel point of the display image, and is used for driving each pixel in the display panel to display according to a preset grayscale. It may be understood that the present application does not limit how the display data is represented.

Further, the grayscale data of the target frame image may include a first grayscale extremum and a second grayscale extremum. In the embodiment of the present application, the first grayscale extremum of the target frame image may be a maximum value of a plurality of first grayscales of the target frame image, and the second grayscale extremum of the target frame image may be a maximum value of a plurality of second grayscales of the target frame image.

Further, obtaining the grayscale data of the target frame image according to the display data of the target frame image includes:

Step S 101: obtaining a first grayscale extremum of the target frame image according to the display data of the target frame image;

Further, the first grayscale may be a preset grayscale, and the display data of the target frame image may include a plurality of first grayscales, each of the first grayscales corresponds to one pixel point of the target frame image. For example, the grayscale of the display data of all the frames of the display panel may be represented by an 8-bit binary number, and the grayscale may range from 0 to 255. For a frame display image, the frame display image may include 1024×768 pixels, and a first grayscale of each pixel of the frame display image may range from 16 to 128, that is, for the frame display image, a first grayscale extremum of the frame display image may be 128, that is, a maximum grayscale of the frame display image.

Further, the target frame image may be divided into a plurality of display areas, the first grayscale extremum is a maximum value of a plurality of first grayscales of at least one of the plurality of display areas, and the second grayscale extremum is a maximum value of a plurality of second grayscales of at least one of the plurality of display areas. The maximum value of the grayscales of each display area may be different. Therefore, the first grayscale extremum of the target frame image may also be a maximum value of a plurality of first grayscales in one display area of the frame image. For example, the target frame image may be divided into two display areas. The first grayscale of the first display area ranges from 16 to 108, and the first grayscale of the second display area ranges from 32 to 116. In this case, the first grayscale extremum of the target frame image may be the maximum value 108 of the grayscales of the first display area, or may be the maximum value 116 of the grayscale of the second display area.

It should be noted that one first grayscale may be arbitrarily selected within the first grayscale range of the target frame image for processing as long as the selected first grayscale is conducive to reducing the energy consumption of the display panel using the embodiment of the present application. In an embodiment of the present application, the first grayscale extremum of the target frame image is used as a preferred scheme, and the present application does not limit how to select the first grays level extremum of the target frame image.

Further, obtaining the first grayscale extremum of the target frame image based on the display data of the target frame image includes:

Step S1011: obtaining a first grayscale range of the target frame image based on the display data of the target frame image;

Step S1012: obtaining a first grayscale extremum of the target frame image based on the first grayscale range.

Further, since the target frame image may include a plurality of first grayscales, and each pixel point in the target frame image may correspond to one first grayscale, each of the first grayscales may be converted to obtain a plurality of second grayscales after the conversion. Of course, in the process of converting the plurality of first grayscales of the target frame image, the plurality of first grayscales of the target frame image may be divided into a plurality of sub-intervals, and may be converted according to the plurality of sub-intervals. For another example, in a process of converting a plurality of first grayscales of the target frame image, only first grayscales corresponding to some pixel points in the target frame image may be converted, and first grayscales corresponding to other pixel points in the target frame image may not be converted. It will be understood that the present application does not limit how to convert the plurality of first grayscales of the target frame image.

It should be noted that the driving module may convert the plurality of first grayscales of the target frame image based on a non-linear characteristic between visual perception and luminance to obtain the plurality of second grayscales after the conversion. Wherein, the visual perception can be characterized by a brightness value that can be observed by human eyes, and the luminance can be characterized by a luminance factor. Therefore, based on the non-linear relationship between the visual perception and the luminance of the image, each pixel point of the target frame image can be statistically analyzed to obtain a range of the luminance value of the target frame image. Of course, the grayscale of the target frame image may be statistically analyzed to obtain a range of the grayscale.

Specifically, each of the plurality of second grayscales after the conversion may correspond to one first grayscale before the conversion, or may correspond to a plurality of first grayscales before the conversion. It can be understood that different conversion modes may generate different correspondence between the first grayscale and the second grayscale. The present application does not limit the correspondence between the first grayscale and the second grayscale.

Further, the second grayscale extremum is a maximum value of the plurality of second grayscales of the target frame image. That is, the second grayscale extremum has a similar meaning to the first grayscale extremum. For example, for a frame display image, the frame display image may include 1024×768 pixels, and the first grayscale of each pixel of the frame display image may range from 16 to 128, that is, for the frame display image, the first grayscale extremum of the frame display image may be 128. After converting the plurality of first grayscales of the target frame image, the second grayscale of each pixel of the frame display image may range from 32 to 216, and the first grayscale extremum of the frame display image may be 216.

In step S102, a plurality of first grayscales of the target frame image are converted to obtain a second grayscale extremum of the target frame image.

Wherein, converting a plurality of first grayscales of a target frame image to obtain a second grayscale extremum of the target frame image comprises:

Step S1021: converting the plurality of first grayscales of a target frame image to obtain a plurality of second grayscales after the conversion;

Step S1022: obtaining a second grayscale extremum of the target frame image based on the plurality of second grayscales after the conversion.

Converting a plurality of first grayscales of a target frame image to obtain a plurality of second grayscales after the conversion may include: dividing the range of the first grayscale of the target frame image into a plurality of sub-intervals; converting the plurality of first grayscales of the target frame image based on the divided plurality of sub-intervals and preset conversion coefficients to obtain a plurality of second grayscales which are converted. For example, the plurality of second grayscales may be obtained by multiplying a preset conversion coefficient with the plurality of first grayscales of the target frame image.

Figure 2:
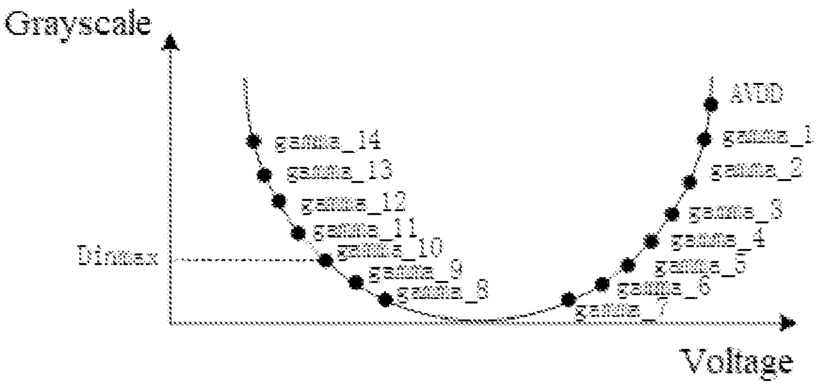
FIG. 2 shows a schematic diagram before a conversion of grayscales according to an embodiment of the present application.
Figure 3:
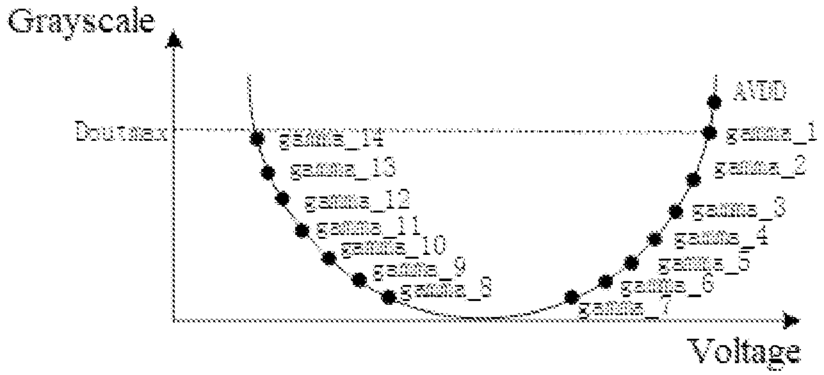
FIG. 3 shows a schematic diagram after a conversion of grayscales according to an embodiment of the present application.

FIG. 2 shows a schematic diagram before a conversion of grayscales according to an embodiment of the present application, and FIG. 3 shows a schematic diagram after a conversion of grayscales according to an embodiment of the present application.

As shown in FIGS. 2 and 3, the horizontal axis may represent voltage, and the vertical axis may represent grayscale. In FIG. 2, it can be seen that the maximum value of the first grayscales of the target frame image may correspond to a voltage value of a 10th stage gamma voltage before the first grayscales are converted. In FIG. 3, after converting the first grayscales, it can be seen that the maximum value of the second grayscales of the target frame image may correspond to a voltage value of a 1st stage gamma voltage. That is, after the conversion, the maximum value of the grayscales of the target frame image may be larger than the maximum value of the grayscales before the conversion.

By performing conversion using the piecewise function in formula (1), the embodiment of the present application can adapt the grayscale of the target frame image to the voltage value of the first power supply voltage, and ensure the quality of the display image after adjusting the voltage value of the first power supply voltage.

For example, step S1021 may be represented by the following formula (1):

$$Dout(n) = \begin{cases} \lambda_1 \times Din_n, & C_0 < Din_n < C_1 \\ \lambda_2 \times Din_n, & C_1 < Din_n < C_2 \\ \quad \ldots \ldots \\ \lambda_m \times Din_n, & C_{m-1} < Din_n < C_m \end{cases}$$

Where $Din_n$ may represent a first grayscale an n-th pixel point in the target frame image inputted before conversion; $\lambda_1$ may represent a coefficient corresponding to $Din_n$ in a case where the first grayscale of the n-th pixel point in the target frame image inputted is in a range of $C_0$ to $C_1$; $\lambda_2$ may represent a coefficient corresponding to $Din_n$ in a case where the grayscale of the n-th pixel point in the target frame image is in a range of $C_1$ to $C_2$. By analogy, $\lambda_m$ may represent a coefficient corresponding to $Din_n$ in a case where the grayscale of the n-th pixel point in the target frame image is in a range of $C_{m-1}$ to $C_m$. Dout (n) may represent a second grayscale after the conversion of the n-th pixel point in the target frame image. m may be used to represent a number of the sub-intervals. In an example, $C_0$ may be 0, and $C_m$ may be 255.

Further, the range of the first grayscale of the target frame image is divided into a plurality of sub-intervals. For example, for a frame display image, the frame display image may include 1024×768 pixels, and the first grayscale of each pixel of the frame display image may range from 16 to 128, where $C_0$ may be 16, $C_1$ may be 32, and $C_m$ may be 126. It will be appreciated that the present application does not limit how to divide the plurality of sub-intervals and the number of sub-intervals.

Further, the first gray level corresponding to at least one pixel point of the target frame image may be converted according to equation (1). For example, a conversion coefficient may be assigned to the first grayscale, and the conversion coefficient may be multiplied by the first grayscale to obtain a second grayscale corresponding to the first grayscale. The conversion coefficients may be stored in a memory in advance. It will be understood that the present application does not limit how the conversion coefficients are determined.

By dividing the range of the first grayscale of the target frame image into a plurality of sub-intervals, and converting the plurality of first grayscales of the target frame image according to the plurality of sub-intervals divided and preset conversion coefficients to obtain a plurality of converted second grayscales, the embodiment of the present application can flexibly configure to convert the grayscales of the target frame image, and further can dynamically and adaptively adjust the voltage value of the second power supply voltage in different application scenarios, thereby further saving power consumption.

Step S20: configuring a voltage value of a first power supply voltage of the display based on the grayscale data to obtain a voltage value of a second power supply voltage;

Further, the step of configuring the voltage value of the first power supply voltage of the display based on the grayscale data to obtain the voltage value of the second power supply voltage includes:

Step S201: determining a voltage value of a first gamma voltage corresponding to a first grayscale extremum according to the first grayscale extremum;

Step S202: determining a gamma reference voltage according to the voltage value of the first gamma voltage;

Step S203: adjusting the voltage value of the first power supply voltage according to the gamma reference voltage to obtain the voltage value of the second power supply voltage.

For example, to determine the gamma reference voltage according to the voltage value of the first gamma voltage, the gamma reference voltage corresponding to the voltage value of the first gamma voltage may be determined first, and then a new gamma reference voltage may be re-determined. Since the voltage value of the first gamma voltage of each stage is associated with the gamma reference voltage, the voltage values of the first gamma voltages of other stages are adjusted synchronously as a whole after the new gamma reference voltage is re-determined.

In the embodiment of the present application, the first grayscale extremum may be a first grayscale extremum of a plurality of first grayscales of the target frame image before conversion, and the second grayscale extremum may be a second grayscale extremum of a plurality of second grayscales of the target frame image before conversion. The first grayscale extremum and the second grayscale extremum may be different. By adjusting the voltage value of the preset first power supply voltage by the difference between the first grayscale extremum before the conversion and the second grayscale extremum after the conversion, it is possible to find a minimum voltage value of the first power supply voltage required to ensure the optimal display, and use the minimum voltage value of the first power supply voltage as the voltage value of the second power supply voltage, thereby further reducing the power consumption of the display panel while ensuring the display effect of the display panel.

In an example, 14 stages of gamma (i.e., gamma) voltages are pre-stored in the driving module, and the voltage value of each stage of gamma voltage may correspond to one grayscale (i.e., gray). For example, the voltage value of the gamma voltage corresponding to a gray scale of 0 may be the voltage value of the 1st stage gamma voltage, i.e., gamma_1; the voltage value of the gamma voltage corresponding to the gray scale of 228 may be the voltage value of a 14th stage gamma voltage, that is, gamma_14. Further, the voltage value of the 14th stage gamma voltage may correspond to a voltage value of one first power supply voltage (i.e., the AVDD voltage). It should be noted that the voltage values of a plurality of groups of gamma voltages may be set in the driving module, and the voltage values of each group of gamma voltages may include the voltage values of 14 stages of the gamma voltages. It may be understood that the present application does not limit the correspondence between the grayscale, the voltage value of the gamma voltage, and the voltage value of the first power supply voltage.

Further, the voltage value of the first gamma voltage corresponding to the first grayscale extremum is determined based on the first grayscale extremum, and it can be expressed by the following formula (2):

$$gamma\_num = f1(Din_{max})$$

Where $Din_{max}$ may represent a first grayscale extremum of the target frame image inputted; gamma_num denotes the voltage value of the gamma voltage corresponding to the first grayscale extremum of the target frame image (i.e., the voltage value of the first gamma voltage). num may represent the stage of the voltage value of the gamma voltage, for example, gamma_num may be gamma_1 or gamma_3.

Similarly, $Dout_{max}$ may represent a second grayscale extremum of a converted target frame image. With $Dout_{max}$ as an input, a voltage value gamma_num' of the second gamma voltage corresponding to the second grayscale extremum can be obtained using the formula (2).

Further, the preset voltage value of the first power supply voltage may be represented by a string of binary numbers, for example, 1010 may represent that the voltage value of the first power supply voltage is 10V. The voltage value of the preset first power supply voltage may be stored in a memory in advance. It may be understood that the present application does not limit how the voltage value of the power supply voltage is expressed.

Further, the gamma reference voltage may be used to determine a voltage value of the second power supply voltage. The gamma reference voltage is determined based on the voltage value of the first gamma voltage, and it may be expressed by the following formula (3):

$$\text{gamma\_ref}=f2(\text{gamma\_num})$$

Where gamma_ref represents a gamma reference voltage, and gamma_num represents the voltage value of the first gamma voltage corresponding to the first grayscale extremum of the target frame image. Of course, the gamma reference voltage may also be determined based on the voltage value of the second gamma voltage.

Further, the step of adjusting the voltage value of the first power supply voltage according to the gamma reference voltage to obtain the voltage value of the second power supply voltage includes:

Step S2031: determining a voltage value of a second gamma voltage corresponding to the second grayscale extremum based on the second grayscale extremum;

Step S2032: adjusting a voltage value of each stage of gamma voltages based on the voltage value of the second gamma voltage and the gamma reference voltage to obtain an voltage value of each stage of gamma voltages adjusted;

Step S2033: adjusting the voltage value of the preset first power supply voltage based on the voltage value of each stage of gamma voltages adjusted and the gamma reference voltage to obtain the voltage value of the second power supply voltage.

Further, the voltage value of each stage of gamma voltages adjusted is obtained by adjusting a voltage value of each stage of gamma voltages based on the voltage value of the second gamma voltage and the gamma reference voltage, and it can be expressed by the following formula (4):

$$\text{gamma}(n)=f3(\text{gamma\_num}', \text{gamma\_ref})$$

Where gamma_num' represents a voltage value of the second gamma voltage corresponding to the second grayscale extremum of the target frame image; gamma(n) may represent a voltage value of an n-th stage gamma voltage adjusted.

Further, the voltage value of the first power supply voltage set in advance is adjusted based on the voltage value of each stage of gamma voltages adjusted and the gamma reference voltage to obtain the voltage value of the second power supply voltage, and it can be expressed by the following formula (5):

$$\text{AVDD}'=f4(\text{gamma}(n), \text{gamma\_ref})$$

Here, AVDD' denotes a voltage value of the second power supply voltage obtained by adjusting the voltage value of the preset first power supply voltage. AVDD' may be greater than the maximum value gamma_max of the voltage values of the plurality of second gamma voltages, which may be expressed by the following formula (6):

$$\text{AVDD}'=\text{gamma\_max}+\Delta V$$

Where ΔV may be greater than 0, and indicates the difference between AVDD' and gamma_max. The ΔV may be determined according to circumstances, and is not limited here.

It should be noted that, in the embodiment of the present application, the functions f1, f2, f3, and f4 may be same or different. It can be understood that in practical applications, corresponding functions can be configured according to actual needs, and the present application does not limit the functions f1, f2, f3 and f4.

By detecting the display data of the target frame image, determining the voltage value of the maximum gamma voltage corresponding to the grayscale data, determining the new gamma reference voltage by analyzing the gamma, and determining the voltage value of the second power supply voltage based on the new gamma reference voltage as the minimum voltage value required to satisfy the optimal display, the embodiment of the present application can dynamically adjust the power supply configuration of the display system to achieve a target of reducing the power consumption of the display, and at a same time ensure picture quality, and avoid a flicker problem of the picture.

Step S30: transmitting the second power supply voltage in a parallel transmission manner and caching the voltage value of the second power supply voltage;

It should be noted that in the embodiment of the present application, the display data and the grayscale data of the display may be cached, and the display data and the grayscale data of the display may be transmitted in a parallel transmission manner, so as to accelerate a speed of determining the voltage value of the second power supply voltage and improve the efficiency of updating the voltage value of the second power supply voltage in real time. It may be understood that the embodiments of the present application are not limited to objects or subjects employing the parallel transmission manner.

Further, the step of transmitting the second power supply voltage in a parallel transmission manner, and caching the voltage value of the second power supply voltage includes:

Step S301: acquiring a clock signal corresponding to the voltage value of the second power supply voltage;

Step S302: performing parallel transmission of the second power supply voltage according to the clock signal;

Step S303: caching the voltage value of the second power supply voltage.

Figure 4:
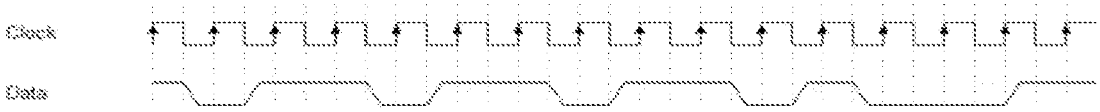
FIG. 4 shows a schematic diagram of transmission of power supply voltage data in the related art.

FIG. 4 shows a schematic diagram of the transmission of the power supply voltage data in the related art.

As shown in FIG. 4, in the related art, power supply voltage data (i.e., Data) is transmitted in a serial transmission manner based on a clock signal (Clock). Specifically, in the related art, the data changes are made during a low level of the clock signal.

Figure 5:
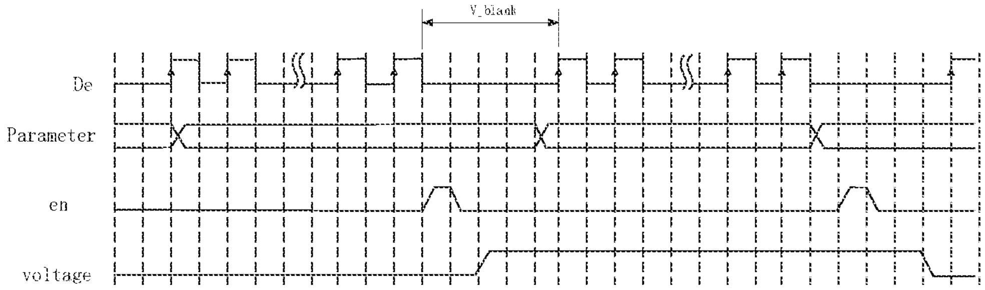
FIG. 5 shows a schematic diagram of transmission of power supply voltage data according to an embodiment of the present application.

FIG. 5 shows a schematic diagram of the transmission of the power supply voltage data according to an embodiment of the present application.

As shown in FIG. 5, the step of acquiring the clock signal corresponding to the voltage value of the second power supply voltage includes:

Step S 3011: acquiring power supply parameters corresponding to the voltage value of the second power supply voltage, wherein the power supply parameters include a clock signal, a power supply configuration signal, and an enable signal.

Referring to FIG. 5, an embodiment of the present application transmits the power supply voltage data in a parallel transmission manner. Wherein, De may represent a clock signal; Parameter may represent a power supply voltage configuration signal for configuring a voltage value related parameter of the second power supply voltage; en may represent an enable signal; voltage may represent a voltage value of the second supply voltage.

Further, the step of performing parallel transmission of the voltage value of the second power supply voltage according to the clock signal includes:

Step S3021: determining a blank time of the clock signal based on the power supply configuration signal;

Step S3022: starting the parallel transmission of the second power supply voltage during the blank time according to the clock signal.

In FIG. 5, for example, a power supply voltage configuration signal may be transmitted in the parallel transmission manner. The clock signal corresponding to one frame of the power supply voltage configuration signal may include a blank time and a non-blank time. During the non-blank time, the enable signal may be at a low level, and the second power supply voltage data may not be transmitted; during the blank time, the enable signal starts to be pulled up from the low level to the high level, thereafter, the second power supply voltage starts to be transmitted, and the current transmission does not end until the enable signal is pulled down from the high level to the low level. Of course, the duration of the blank time may be configured according to the power supply voltage configuration signal, which is not limited in the present application.

Step S40: updating the voltage value of the second power supply voltage cached in real time according to a current update time of the target frame image.

Further, the step of updating the voltage value of the second power supply voltage in real time according to the current updating time of the target frame image includes:

Step S401: determining a current updating time of the target frame image based on the display data of the target frame image;

Step S402: updating the voltage value of the second power supply voltage in real time according to the updating time.

Wherein the current updating time of the target frame image may be associated with display data of the target frame image. In an example, an embodiment of the present application may determine a time node at which display data of the target frame image is transmitted in combination with an image characteristic of the target frame image. For example, the display data of the target frame image may be sequentially transmitted in a time-division manner, or the entire transmission may be completed at one time. It may be understood that the embodiment of the present application does not limit how the current updating time of the target frame image is determined based on the display data of the target frame image.

Further, the operation time of the target frame image includes a non-blank time and a blank time, and the step of determining a current updating time of the target frame image based on the display data of the target frame image includes:

Step S4011: determining a blank time of the target frame image based on the display data of the target frame image;

Step S4012: determining a current updating time of the target frame image within the blank time.

Wherein the display data of the target frame image can be transmitted according to a preset transmission period. Each transmission period may include a non-blank time and a blank time. The display data of the target frame image may be transmitted during a non-blank time of one transmission period; the transmission of the display data of the target frame image may be suspended during the blank time of one transmission period, and the voltage value of the second power supply voltage may be updated in real time. It may be understood that the present application does not limit how the non-blank time and the blank time are divided.

By transmitting the second power supply voltage in a parallel transmission manner, receiving information of the voltage value of the power supply voltage in real time, caching the voltage value of the second power supply voltage, and updating the voltage value of the second power supply voltage in real time according to the updating time of the display data of the target frame image in the blank time, the embodiment of the present application can quickly respond to the updating requirement of the system, reasonably adjust the updating time, improve the transmission efficiency of the power supply voltage data, effectively avoid the problem of screen flicker, and ensure the quality of the display image, while reducing the power consumption of the display.

Further, the driving method of the display further includes:

Step S50: adjusting the driving power of the display panel according to the voltage value of the second power supply voltage.

For example, the driving power of the display panel is adjusted according to the voltage value of the second power supply voltage, and it may be expressed by the following formula (7):

$$Power=AVDD'*I$$

Where Power may represent the power of the display panel of the embodiment of the present application, and I may represent a current corresponding to AVDD'. In the driving method of the present application, the AVDD' may be minimized when the display quality is ensured, so that the power consumption of the display panel can be further reduced while the display effect of the display panel is ensured.

Figure 6:
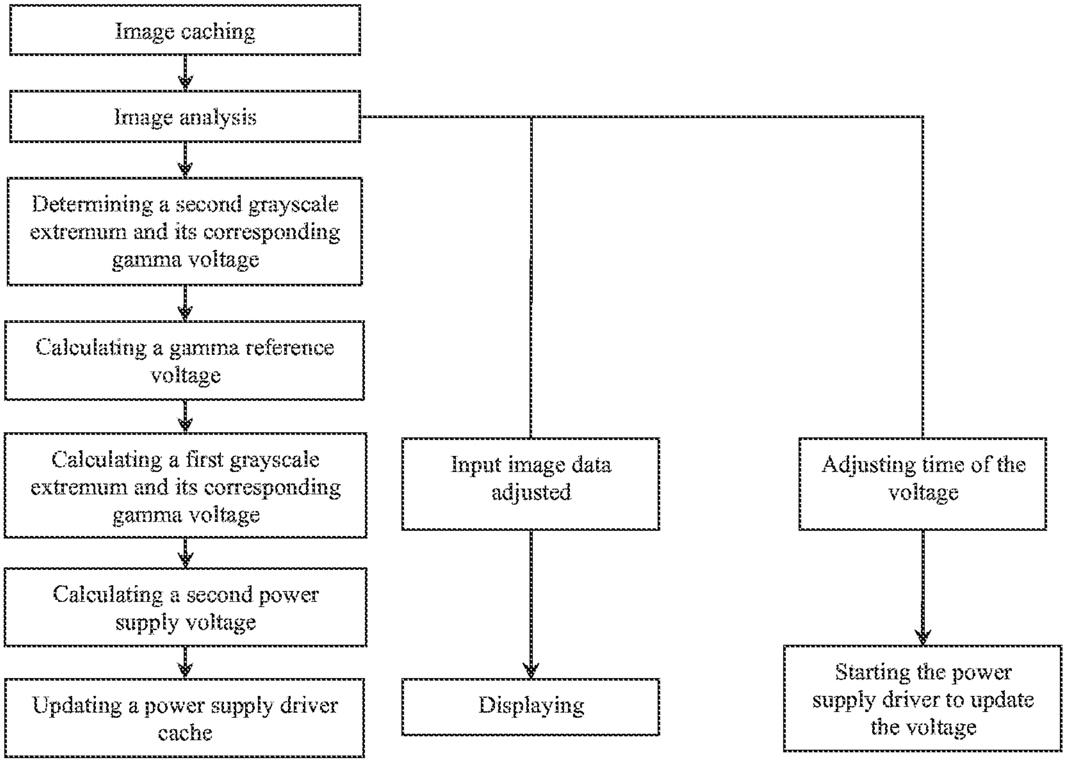
FIG. 6 shows a schematic diagram of a driving method for a display according to an embodiment of the present application.

FIG. 6 shows a schematic diagram of a driving method of a display according to an embodiment of the present application.

As shown in FIG. 6, in the embodiment of the present application, for example, image data inputted may be first cached, then the first grayscale range of the target frame image and the first grayscale extremum of the target frame image are determined through image analysis, and the display data inputted is adjusted according to the first grayscale range of the target frame image to obtain the adjusted input image data and a plurality of second grayscales. The second grayscale extremum and the voltage value of the second gamma voltage corresponding to the second grayscale extremum can then be determined among the plurality of second grayscales, and the gamma reference voltage can be calculated. At a same time, the first grayscale extremum and the voltage value of the first gamma voltage corresponding to the first grayscale extremum may be calculated. Finally, the adjusted AVDD value (i.e., the voltage value of the second power supply voltage) is calculated, and the cache of the external power supply driver is performed.

At a same time, after the image analysis, the updating time of the voltage can be adjusted, the power supply driver is started to update the voltage at the updating time, and finally, the display panel is driven to display the screen together with the adjusted input image data. It may be understood that an order shown in FIG. 6 does not constitute a limitation on the implementation of the steps of the embodiment of the present application.

The present application further provides a display. The display includes: a grayscale obtaining module electrically connected to a power supply configuration module, and configured to obtain grayscale data of a target frame image according to display data of the target frame image; the power supply configuration module electrically connected to the grayscale obtaining module and a power supply cache module, configured to configure a voltage value of a first power supply voltage of the display based on the grayscale data to obtain a voltage value of a second power supply voltage; a power supply transmission module electrically connected to the power supply configuration module and a power supply updating module, configured to transmit the second power supply voltage in a parallel transmission manner, and cache a voltage value of the second power supply voltage; the power supply updating module electrically connected to the power supply cache module, and configured to update the voltage value of the second power supply voltage cached in real time according to the current updating time of the target frame image.

Figure 7:
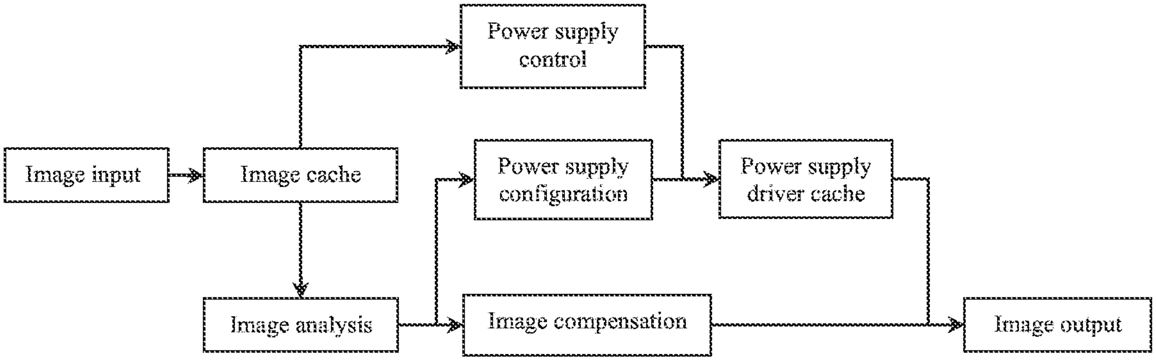
FIG. 7 shows a schematic structural diagram of a display according to an embodiment of the present application.

FIG. 7 shows a schematic structural diagram of a display according to an embodiment of the present application.

As shown in FIG. 7, an image caching may be performed on an input image. Wherein the image caching may be implemented with a register. The image caching may read and cache display data of a prestored target frame. When the image caching receives an instruction from the system to start image processing, the image caching may send display data of the cached target frame to image analysis for analysis.

Further, the image analysis may receive the display data of the target frame sent from the image caching, and analyze the display data of the target frame. Since there is a non-linear relationship between the visual perception of the image and the luminance, the visual perception can be characterized by a brightness value that can be observed by human eyes, and the luminance can be characterized by a brightness factor. Therefore, based on the non-linear relationship between the visual perception of the image and the luminance, each pixel of the target frame image can be statistically analyzed to obtain a range of the brightness value of the target frame image. Meanwhile, the distribution of the brightness value of each frame of the target image may be analyzed, and the voltage value of the gamma voltage corresponding to the distribution of the brightness value may be determined. Of course, the grayscale of the target frame image may be statistically analyzed to obtain a range of the grayscale.

Further, based on the non-linear relationship between the visual perception of the image and the luminance, the grayscale of the target frame image can be segmented, and the first grayscales are converted using the piecewise function to obtain converted second grayscales.

Further, the voltage value of the power supply voltage may be configured based on a result of the image analysis, the voltage value of the power supply voltage may be cached to the power supply driver in combination with the power supply control, and the final image output may be controlled together with the image compensated data. It may be understood that the structure in FIG. 7 is exemplary, and the present application does not limit the specific structure of the display.

In conclusion, in the embodiment of the present application, grayscale data of the target frame image is obtained according to the display data of the target frame image, the voltage value of the second power supply voltage is obtained by configuring the voltage value of the first power supply voltage of the display based on the grayscale data, the second power supply voltage is transmitted in a parallel transmission manner, the voltage value of the second power supply voltage is cached, and finally the voltage value of the second power supply voltage cached is updated in real time according to the current updating time of the target frame image, so that the voltage value of the second power supply voltage can be dynamically and adaptively adjusted, the power consumption of the display panel is reduced, the transmission efficiency of the power supply voltage data is improved, and the quality of the display screen is ensured.

In the above-mentioned embodiments, the description of each embodiment has its own emphasis. For parts that are not described in detail in a certain embodiment, reference may be made to the relevant descriptions of other embodiments.

The driving method and the display provided in the embodiments of the present application are described in detail above. The principles and implementation of the present application are described in detail here with specific examples. The above description of the embodiments is merely intended to help understand the technical solutions and core ideas of the present application. Those of ordinary skill in the art should appreciate that they may still modify the technical solutions described in the foregoing embodiments, or equivalently replace some of the technical features therein; these modifications or substitutions do not deviate the nature of the respective solutions from the scope of the solutions of the embodiments of the present application.

What is claimed is:

1. A driving method of a display, wherein the driving method of the display comprises following steps:

- obtaining a first grayscale extremum from a plurality of first grayscales of a target frame image of the display based on display data of the target frame image;
- converting the plurality of first grayscales of the target frame image to obtain a second grayscale extremum of the target frame image;
- determining a voltage value of a first gamma voltage corresponding to the first grayscale extremum based on the first grayscale extremum;
- determining a gamma reference voltage based on the voltage value of the first gamma voltage;
- determining a voltage value of a second gamma voltage corresponding to the second grayscale extremum based on the second grayscale extremum;
- adjusting a voltage value of a gamma voltage of each of stages based on the voltage value of the second gamma voltage and the gamma reference voltage to obtain an adjusted voltage value of a gamma voltage of each of stages;
- adjusting a voltage value of a preset first power supply voltage based on the adjusted voltage value of the gamma voltage of each of the stages and the gamma reference voltage to obtain a voltage value of a second power supply voltage;
- transmitting the second power supply voltage using a parallel transmission manner, and caching the voltage value of the second power supply voltage; and updating the voltage value of the second power supply voltage cached in real time based on a current updating time of the target frame image.

2. The driving method of the display according to claim 1, wherein the grayscale data comprises the first grayscale extremum and the second grayscale extremum.

3. The driving method of the display according to claim 2, wherein the step of obtaining the first grayscale extremum of the target frame image based on the display data of the target frame image comprises:

obtaining a first grayscale range of the target frame image based on the display data of the target frame image; and obtaining the first grayscale extremum of the target frame image based on the first grayscale range.

4. The driving method of the display according to claim 2, wherein the step of converting the plurality of first grayscales of the target frame image to obtain the second grayscale extremum of the target frame image comprises:

converting the plurality of first grayscales of the target frame image to obtain a plurality of converted second grayscales; and obtaining the second grayscale extremum of the target frame image based the plurality of converted second grayscales.

5. The driving method of the display according to claim 1, wherein the step of transmitting the second power supply voltage using the parallel transmission manner and caching the voltage value of the second power supply voltage comprises following steps:

acquiring a clock signal corresponding to the voltage value of the second power supply voltage;

performing the parallel transmission of the second power supply voltage based on the clock signal; and caching the voltage value of the second power supply voltage.

6. The driving method of the display according to claim 5, wherein the step of acquiring the clock signal corresponding to the voltage value of the second power supply voltage comprises:

acquiring power supply parameters corresponding to the voltage value of the second power supply voltage, wherein the power supply parameters comprise the clock signal, a power supply configuration signal and an enable signal.

7. The driving method of the display according to claim 6, wherein the step of performing the parallel transmission of the second power supply voltage based on the clock signal comprises:

determining a blank time of the clock signal based on the power supply configuration signal; and starting the parallel transmission of the second power supply voltage during the blank time based on the clock signal.

8. The driving method of the display according to claim 2, wherein the first grayscale extremum is a maximum value of the plurality of first grayscales of the target frame image, and the second grayscale extremum is a maximum value of a plurality of second grayscales of the target frame image.

9. A display, wherein the display comprises a processor for executing a method, the method comprises:

obtaining a first grayscale extremum from a plurality of first grayscales of a target frame image of the display based on display data of the target frame image;

converting the plurality of first grayscales of the target frame image to obtain a second grayscale extremum of the target frame image;

determining a voltage value of a first gamma voltage corresponding to the first grayscale extremum based on the first grayscale extremum;

determining a gamma reference voltage based on the voltage value of the first gamma voltage;

determining a voltage value of a second gamma voltage corresponding to the second grayscale extremum based on the second grayscale extremum;

adjusting a voltage value of a gamma voltage of each of stages based on the voltage value of the second gamma voltage and the gamma reference voltage to obtain an adjusted voltage value of a gamma voltage of each of stages;

adjusting a voltage value of a preset first power supply voltage based on the adjusted voltage value of the gamma voltage of each of the stages and the gamma reference voltage to obtain a voltage value of a second power supply voltage;

transmitting the second power supply voltage in a parallel transmission manner, and caching the voltage value of the second power supply voltage; and updating the voltage value of the second power supply voltage cached in real time based on a current updating time of the target frame image.

10. The display according to claim 9, wherein the grayscale data comprises the first grayscale extremum and the second grayscale extremum.

11. The display according to claim 10, wherein the obtaining module obtaining of the first grayscale extremum of the target frame image based on the display data of the target frame image comprises:

obtaining a first grayscale range of the target frame image based on the display data of the target frame image; and a first grayscale extremum obtaining submodule configured to obtain the first grayscale extremum of the target frame image based on the first grayscale range.

12. The display according to claim 10, wherein the converting of the plurality of the first grayscales of the target frame image to obtain the second grayscale extremum of the target frame image comprises:

converting the plurality of first grayscales of the target frame image to obtain a plurality of converted second grayscales; and obtaining the second grayscale extremum of the target frame image based on the plurality of converted second grayscales.

13. The display according to claim 9, wherein the transmitting of the second power supply voltage in the parallel transmission manner, and caching the voltage value of the second power supply voltage comprises:

obtaining a clock signal corresponding to the voltage value of the second power supply voltage;

performing the parallel transmission of the second power supply voltage based on the clock signal; and caching the voltage value of the second power supply voltage.

14. The display according to claim 13, wherein the obtaining of the clock signal corresponding to the voltage value of the second power supply voltage comprises:

acquiring power supply parameters corresponding to the voltage value of the second power supply voltage, wherein the power supply parameters comprise the clock signal, a power supply configuration signal and an enable signal.

15. The display according to claim 14, wherein the performing of the parallel transmission of the second power supply voltage based on the clock signal comprises:

determining a blank time of the clock signal based on the power supply configuration signal; and starting the parallel transmission of the second power supply voltage during the blank time based on the clock signal.

16. The display according to claim 10, wherein the first grayscale extremum is a maximum value of the plurality of first grayscales of the target frame image, and the second grayscale extremum is a maximum value of a plurality of second grayscales of the target frame image.

* * * * *